United States Patent
Wang et al.

(10) Patent No.: US 11,113,836 B2
(45) Date of Patent: Sep. 7, 2021

(54) OBJECT DETECTION METHOD, DEVICE, APPARATUS AND COMPUTER-READABLE STORAGE MEDIUM

(71) Applicant: Baidu Online Network Technology (Beijing) Co., Ltd., Beijing (CN)

(72) Inventors: Xuehui Wang, Beijing (CN); Ming Li, Beijing (CN); Tian Xia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 66 days.

(21) Appl. No.: 16/512,249

(22) Filed: Jul. 15, 2019

(65) Prior Publication Data
US 2020/0074665 A1    Mar. 5, 2020

(30) Foreign Application Priority Data

Sep. 3, 2018    (CN) .......................... 201811018729.6

(51) Int. Cl.
   *G06T 7/62*    (2017.01)
   *G06K 9/46*    (2006.01)

(52) U.S. Cl.
   CPC .............. *G06T 7/62* (2017.01); *G06K 9/4604* (2013.01); *G06K 9/4642* (2013.01); *G06K 2209/21* (2013.01); *G06T 2207/20081* (2013.01)

(58) Field of Classification Search
   CPC ........... G06K 2209/21; G06K 9/00664; G06K 9/00771; G06K 9/00805; G06K 9/3233;
   (Continued)

(56) References Cited

U.S. PATENT DOCUMENTS

2008/0002855 A1    1/2008    Rai et al.
2016/0342837 A1    11/2016   Zhibin et al.
(Continued)

FOREIGN PATENT DOCUMENTS

CN    107134144 A    9/2017
CN    107301378 A    10/2017
(Continued)

OTHER PUBLICATIONS

M. Dubuisson Jolly, S. Lakshmanan and A. K. Jain, "Vehicle segmentation and classification using deformable templates," in IEEE Transactions on Pattern Analysis and Machine Intelligence, vol. 18, No. 3, pp. 293-308, Mar. 1996, doi: 10.1109/34.485557. (Year: 1996).*

(Continued)

*Primary Examiner* — Kim Y Vu
*Assistant Examiner* — Francisco A Agra
(74) *Attorney, Agent, or Firm* — Knobbe, Martens, Olsons & Bear, LLP

(57) ABSTRACT

Embodiments of object detection method, device, apparatus and a computer-readable storage medium are provided. The method can include: obtaining an enclosing frame of a target object in an input image; according to the enclosing frame, determining a reference frame from a predetermined candidate frame set comprising a plurality of candidate frames; generating a size-related feature according to a size of the reference frame and a size of the enclosing frame; and detecting an object in the input image by applying the size-related feature in a machine learning model. In an embodiment of the present application, the object detection is performed by using a feature related to an object size, that is, the prediction criterion related to the object size is added to an original feature in a machine learning model, thereby further improving the accuracy of the object detection.

11 Claims, 4 Drawing Sheets

(58) Field of Classification Search
CPC .. G06K 9/3241; G06K 9/4604; G06K 9/4642; G06K 9/6201; G06K 9/6215; G06K 9/6256; G06T 2207/10016; G06T 2207/10024; G06T 2207/20021; G06T 2207/20081; G06T 2207/20084; G06T 2207/30196; G06T 2207/30232; G06T 2207/30241; G06T 7/11; G06T 7/194; G06T 7/20; G06T 7/215; G06T 7/246; G06T 7/248; G06T 7/254; G06T 7/62; G06T 7/73; G06T 7/74

See application file for complete search history.

(56) References Cited

U.S. PATENT DOCUMENTS

| | | | | |
|---|---|---|---|---|
| 2017/0206431 | A1* | 7/2017 | Sun | G06F 16/5838 |
| 2018/0025249 | A1* | 1/2018 | Liu | G06N 3/04 |
| | | | | 382/158 |
| 2018/0204076 | A1* | 7/2018 | Tripathi | G06K 9/6269 |
| 2019/0130580 | A1* | 5/2019 | Chen | G06K 9/6267 |
| 2019/0266747 | A1* | 8/2019 | Zhou | G06K 9/4628 |
| 2019/0304102 | A1* | 10/2019 | Chen | G06K 9/6271 |

FOREIGN PATENT DOCUMENTS

| | | |
|---|---|---|
| CN | 107451602 A | 12/2017 |
| CN | 108009544 A | 5/2018 |
| CN | 108230292 A | 6/2018 |
| JP | 2017191501 A | 10/2017 |

OTHER PUBLICATIONS

Z. Chen, T. Ellis and S. A. Velastin, "Vehicle type categorization: A comparison of classification schemes," 2011 14th International IEEE Conference on Intelligent Transportation Systems (ITSC), Washington, DC, 2011, pp. 74-79, doi: 10.1109/ITSC.2011.6083075. (Year: 2011).*

S. Ren, K. He, R. Girshick, and J. Sun, "Faster R-CNN: Towards real-time object detection with region proposal networks" in IEEE Transactions on Pattern Analysis and Machine Intelligence, vol. 39, No. 6, pp. 1137-1149. (Year: 2017).*

Extended European Search Report dated Feb. 10, 2020, for Application No. 19185959.4, in 11 pages.

Chen, et al., "Border-Oriented Post-Processing Refinement on Detected Vehicle Bounding Box for ADAS," Proceedings of SPIE; [Proceedings of SPIE ISSN 0277-786X vol. 10524], SPIE, US, vol. 10615, Apr. 10, 2018, pp. 106150B-106150B, XP060101499.

Supplementary Search Report dated Sep. 19, 2019, for Application No. CN2018110187296, in 4 pages.

Notification to Grant Patent Right for Invention dated Oct. 9, 2019, for Application No. CN2018110187296, in 3 pages.

Ghodrati, Amir, et al., "DeepProposals: Hunting Objects and Actions by Cascading Deep Convolutional Layers", Int J Comput Vis (2017) 124: 115-131. Published Mar. 15, 2017.

Eggert, Christian, et al., "A Closer Look: Small Object Detection in Faster R-CNN", Multimedia Computing and Computer Vision Lab, University of Augsburg. Proceeding of the IEEE International Conference on Multimedia and Expo (ICMC) 2017.

Zhong, Zhun, et al., "Re-ranking Object Proposals for Object Detection in Automatic Driving", Oct. 18, 2018.

* cited by examiner

OBJECT DETECTION METHOD, DEVICE, APPARATUS AND COMPUTER-READABLE STORAGE MEDIUM

CROSS-REFERENCE TO RELATED APPLICATION

This application claims priority to Chinese Patent Application No. 201811018729.6, entitled "Object Detection Method, Device, Apparatus and Computer-Readable Storage Medium", and filed on Sep. 3, 2018, which is hereby incorporated by reference in its entirety.

TECHNICAL FIELD

The present application relates to a field of information technology, and in particular, to an object detection method, device, apparatus and a computer-readable storage medium.

BACKGROUND

Object detection is not difficult for human eyes. By sensing different colors, textures and edge modules in an image, a target object can be located easily. However, the RGB pixel matrix is used in computers, and an abstract concept, such as a dog and a cat, cannot easily be obtained directly from the image and is difficultly located. In addition, postures of an object, illumination, and a complex background are combined, rendering the object detection more difficult.

In the field of computer vision, object detection is one of classic issues. The task of the object detection is to mark a position of an object in an image with a frame and provide an object category. Object detection is becoming more and more mature by developing from a traditional solution in which features are designed manually and a framework of a shallow classifier is used to a solution in which an end-to-end detection framework based on deep learning is used.

A detection algorithm generally includes three parts: a first part of selecting a detection window, a second part of designing a feature, and a third part of design a classifier. Here, in the designing of a feature, it is required to combine and optimize different features. A detection accuracy can be further improved by describing the object in different dimensions. For example, an edge of the object can be encoded with histogram statistics to improve the expression to the feature, which is widely used in object detection, tracking and recognition.

When detecting an object in an image, only a feature of identical length can be obtained by extracting the feature with a deep learning network in each candidate area. This feature has no correlation with an object size and lacks a basis for object size prediction, thereby leading to inaccurate object size prediction. For example, objects in a remote area and a near area of an image are different in size, but in existing technology, the extracted features for such objects with different sizes are identical, thereby resulting in inaccurate object size prediction.

SUMMARY

An object detection method, device, apparatus and a computer-readable storage medium are provided according to embodiments of the present application, so as to at least solve the above technical problems in the existing technology.

According to a first aspect, an object detection method includes:
obtaining an enclosing frame of a target object in an input image;
according to the enclosing frame, determining a reference frame from a predetermined candidate frame set comprising a plurality of candidate frames;
generating a size-related feature according to a size of the reference frame and a size of the enclosing frame; and
detecting an object in the input image by applying the size-related feature in a machine learning model.

In conjunction with the first aspect, in a first implementation of the first aspect of the present application, the according to the enclosing frame, determining a reference frame from a predetermined candidate frame set comprising a plurality of candidate frames includes:
calculating respective overlap degrees of the enclosing frame of the target object with respective candidate frames in the candidate frame set; and
selecting the reference frame from the candidate frames according to the respective overlap degrees.

In conjunction with the first implementation of the first aspect, in a second implementation of the first aspect of the present application, each of the enclosing frame and the candidate frames is of a polygon shape, and the calculating respective overlap degrees of the enclosing frame of the target object with respective candidate frames in the candidate frame set includes:
for each candidate frame,
aligning the enclosing frame with the candidate frame at one vertex;
calculating an intersection-over-union of the enclosing frame with the candidate frame; and
determining the calculated intersection-over-union as the overlap degree of the enclosing frame with the candidate frame.

In conjunction with the first implementation of the first aspect, in a third implementation of the first aspect of the present application, the selecting the reference frame from the candidate frames according to the overlap degrees includes:
in a case that the overlap degree of the enclosing frame with a candidate frame is greater than an overlap threshold, determining the candidate frame as the reference frame.

In conjunction with the first aspect, a first implementation of the first aspect, a second implementation of the first aspect and a third implementation of the first aspect, in a fourth implementation of the first aspect of the present application, the generating a size-related feature according to a size of the reference frame and a size of the enclosing frame includes:
determining a width ratio and a height ratio of the enclosing frame with the reference frame as the size-related feature, or determining a natural logarithm of the width ratio and a natural logarithm of the height ratio as the size-related feature.

In conjunction with the first aspect, a first implementation of the first aspect, a second implementation of the first aspect and a third implementation of the first aspect, in a fifth implementation of the first aspect of the present application, the method further includes:
predetermining a relationship between respective candidate frame sets and respective object categories;
determining an object category to which the object to be detected belongs; and
selecting a candidate frame set according to the determined object category.

According to a second aspect, an object detection device includes:

an obtaining unit configured to obtain an enclosing frame of a target object in an input image;

a determining unit configured to, according to the enclosing frame, determine a reference frame from a predetermined candidate frame set comprising a plurality of candidate frames;

a generating unit configured to generate a size-related feature according to a size of the reference frame and a size of the enclosing frame; and a detecting unit configured to detect an object in the input image by applying the size-related feature in a machine learning model.

In conjunction with the second aspect, in a first implementation of the second aspect of the present application, the determining unit includes:

a calculating sub-unit configured to calculate respective overlap degrees of the enclosing frame of the target object with respective candidate frames in the candidate frame set; and a selecting sub-unit configured to select the reference frame from the candidate frames according to the respective overlap degrees.

In conjunction with the first implementation of the second aspect, in a second implementation of the second aspect of the present application, the calculating sub-unit is further configured to:

for each candidate frame, align the enclosing frame with the candidate frame at one vertex;

calculate an intersection-over-union of the enclosing frame with the candidate frame; and determine the calculated intersection-over-union as the overlap degree of the enclosing frame with the candidate frame.

In conjunction with the first implementation of the second aspect, in a third implementation of the second aspect of the present application, the selecting sub-unit is further configured to:

in a case that the overlap degree of the enclosing frame with a candidate frame is greater than an overlap threshold, determine the candidate frame as the reference frame.

In conjunction with the first aspect, a first implementation of the second aspect, a second implementation of the second aspect and a third implementation of the second aspect, in a fourth implementation of the second aspect of the present application, the generating unit is further configured to:

determine a width ratio and a height ratio of the enclosing frame with the reference frame as the size-related feature, or determine a natural logarithm of the width ratio and a natural logarithm of the height ratio as the size-related feature.

In conjunction with the first aspect, a first implementation of the second aspect, a second implementation of the second aspect and a third implementation of the second aspect, in a fifth implementation of the second aspect of the present application, the device includes further a set selecting unit configured to:

predetermine a relationship between respective candidate frame sets and respective object categories;

determine an object category to which the object to be detected belongs; and select a candidate frame set according to the determined object category.

In a third aspect, an object detection apparatus is provided according to an embodiment of the present application, the apparatus includes: one or more processors; and a storage device configured for storing one or more programs, wherein the one or more programs are executed by the one or more processors to enable the one or more processors to implement the method according to the first aspect.

The functions of the apparatus may be implemented by hardware, or by hardware executing corresponding software. The hardware or software includes one or more modules corresponding to the above functions.

In a possible design, the object detection apparatus includes a processor and a storage, the storage is configured to store a program for supporting the above object detection method executed by the object detection apparatus, the processor is configured to execute the program stored in the storage. The object detection apparatus further includes a communication interface configured for communication between the object detection apparatus and another apparatus or communication network.

In a fourth aspect, a computer-readable storage medium is provided for storing computer software instructions used by the object detection apparatus, the computer software instructions include programs involved in execution of the above object detection method.

One of the above technical solutions has the following advantages or beneficial effects: the object detection is performed by using a feature related to an object size, that is, the prediction criterion related to the object size is added to an original feature in a machine learning model, thereby further improving the accuracy of the object detection.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION OF THE EMBODIMENTS

In the following, only certain example embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
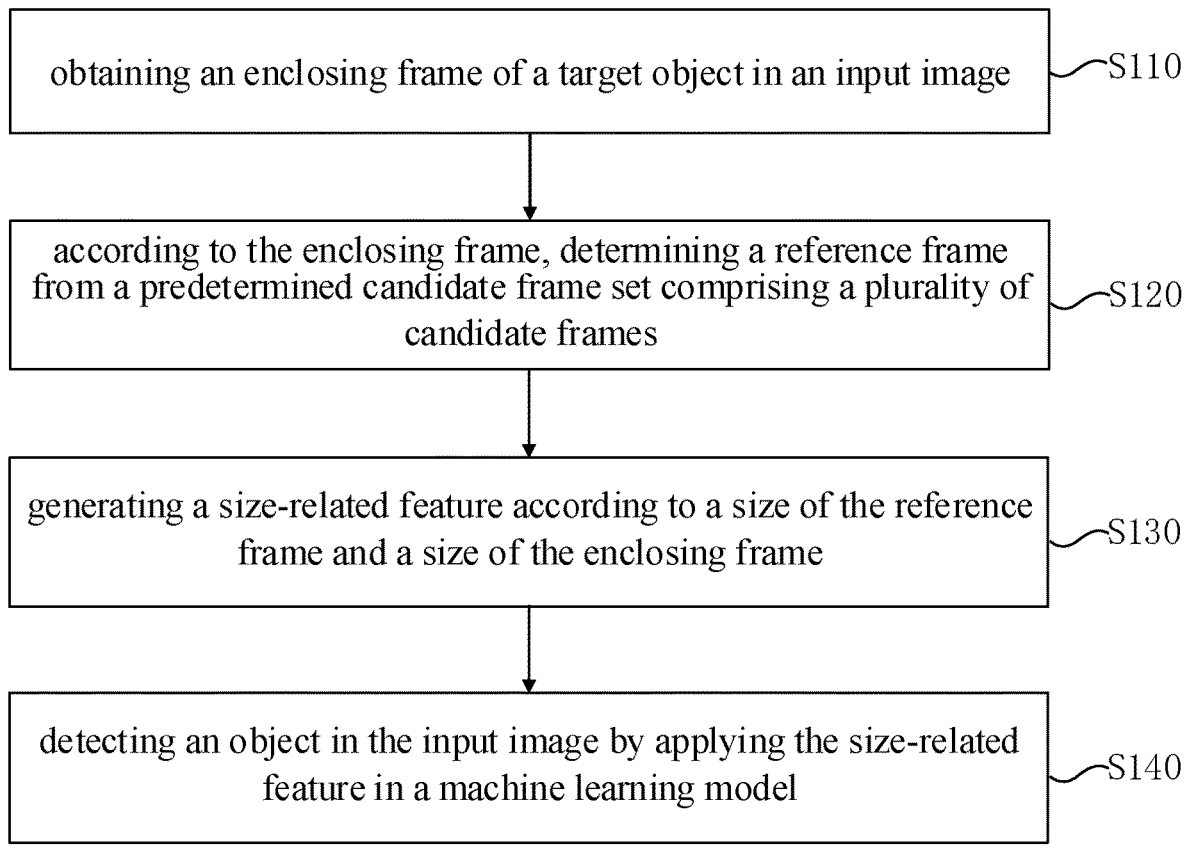
FIG. 1 is a flowchart of an object detection method according to an embodiment of the present application.

FIG. 1 is a flowchart of an object detection method according to an embodiment of the present application. As shown in FIG. 1, the object detection method, including the steps of: Step S110, obtaining an enclosing frame of a target object in an input image; Step S120, according to the enclosing frame, determining a reference frame from a predetermined candidate frame set comprising a plurality of candidate frames; Step S130, generating a size-related feature according to a size of the reference frame and a size of the enclosing frame; and Step S140, detecting an object in the input image by applying the size-related feature in a machine learning model.

In the embodiment of the present application, a candidate frame set is predetermined before performing object detection. A plurality of candidate frames with different sizes are included in the candidate frame set. The enclosing frame of the target object is compared with each of the plurality of candidate frames in the candidate frame set. Then according to comparing results, a plurality of candidate frames that are closer in size of the enclosing frame are selected as reference frames. According to the sizes of the reference frames and the enclosing frame, a feature related to the size and aspect ratio is generated, that is, a size-related feature is generated. On the basis of an original feature in a machine learning model, the size-related features are combined with the original features, and then an object prediction is performed, thereby increasing an accuracy of object size detection.

In one implementation, an algorithm is firstly used to predict an enclosing frame of the object. For example, an image to be processed is divided into blocks, and then each block is determined whether to be the enclosing frame. As another example, a color histogram of the image to be processed is calculated, in which an uneven area in the color histogram may be an edge area of the object, thereby predicting the enclosing frame of the object.

Figure 2:
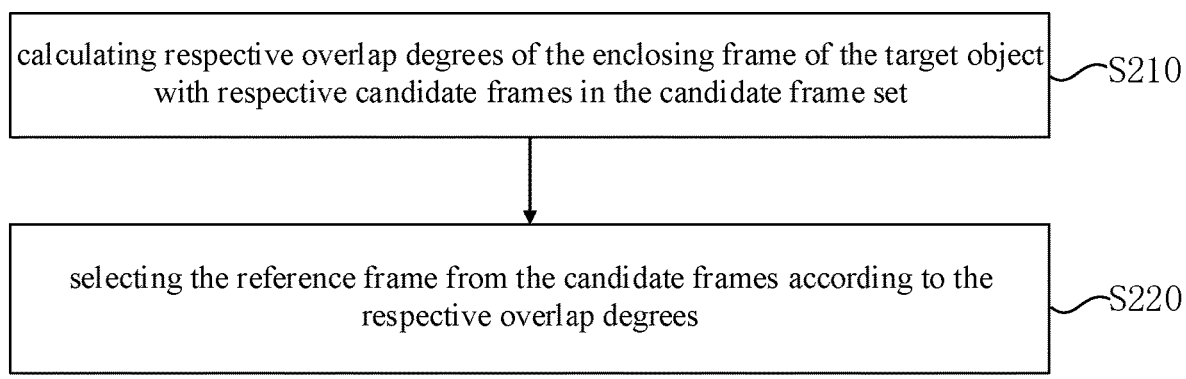
FIG. 2 is a step flowchart of determining a reference frame of an object detection method according to another embodiment of the present application.

FIG. 2 is a flowchart of determining a reference frame of an object detection method according to another embodiment of the present application. As shown in FIG. 2, in one possible implementation, Step S120 in FIG. 1, the according to the enclosing frame, determining a reference frame from a predetermined candidate frame set comprising a plurality of candidate frames, includes: Step S210, calculating respective overlap degrees of the enclosing frame of the target object with respective candidate frames in the candidate frame set; and Step S220, selecting the reference frame from the candidate frames according to the respective overlap degrees.

The candidate frame set may include predetermined rectangular frames with different sizes. The sizes of these rectangular frames may be, for example, identical in width but different in height, different in width but identical in height, different in width and height but identical in aspect ratio, or different in width and length as well as in aspect ratio. In an example, a plurality of rectangular frames with identical aspect ratio but different widths and heights are provided. Assuming an aspect ratio of 1:1, three rectangular frames of 10*10 pixels, 20*20 pixels, and 30*30 pixels can be provided.

In this implementation, an overlap area of the enclosing frame of the target object with each of the candidate frames with different sizes in the candidate frame set is calculated. According to the calculation results, a plurality of candidate frames that are closer in size to the enclosing frame are selected.

Figure 3A:
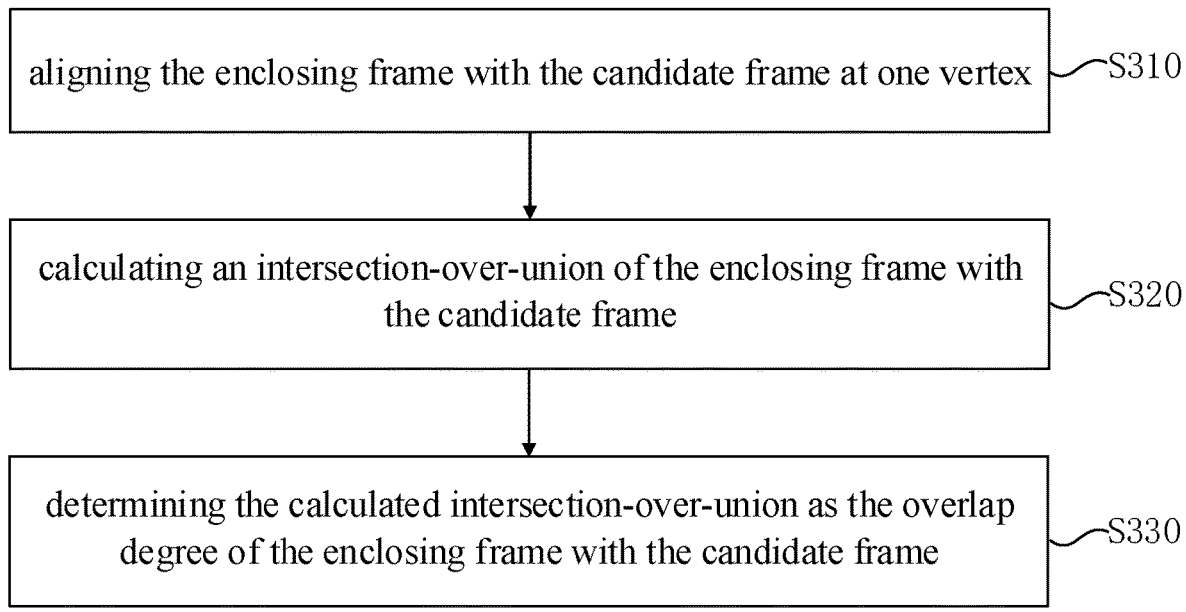
FIG. 3a is a step flowchart of calculating an overlap degree of an object detection method according to another embodiment of the present application.

FIG. 3a is a flowchart of calculating an overlap degree of an object detection method according to another embodiment of the present application. As shown in FIG. 3a, in one possible implementation, each of the enclosing frame and the candidate frames is of a polygon shape, and Step S210 in FIG. 2, the calculating respective overlap degrees of the enclosing frame of the target object with respective candidate frames in the candidate frame set, includes: for each candidate frame, Step S310, aligning the enclosing frame with the candidate frame at one vertex; Step S320, calculating an intersection-over-union of the enclosing frame with the candidate frame; and Step S330, determining the calculated intersection-over-union as the overlap degree of the enclosing frame with the candidate frame.

In this implementation, an IOU (Intersection over Union) standard is used to calculate an overlap area of the enclosing frame with each of the plurality of candidate frames with different sizes. IOU is a standard for measuring the accuracy of detecting an object in a specific data set. Particularly, the enclosing frame can be aligned with a candidate frame. For example, the vertices at the upper left corners of the two rectangles can be aligned; then a ratio of an intersection area to the union area of the two rectangles is calculated as an IOU value of the enclosing frame with the candidate frame. The greater the ratio (IOU value), the greater the overlap degree between the two rectangles.

Figure 3B:
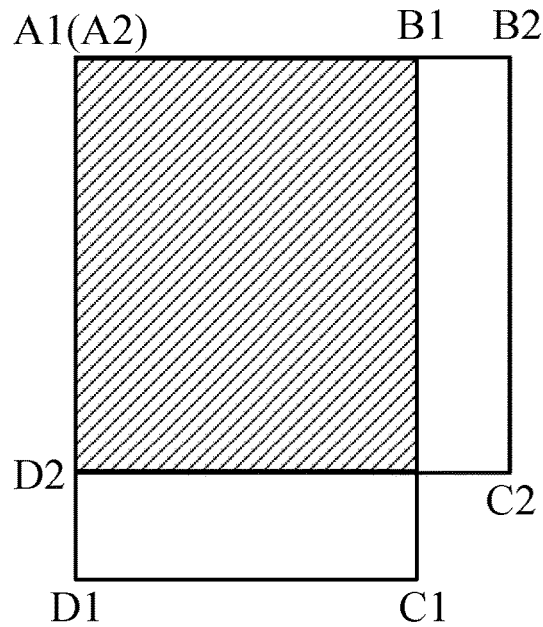
FIG. 3b is a schematic diagram of an intersection area in an overlap degree calculation of an object detection method according to another embodiment of the present application.
Figure 3C:
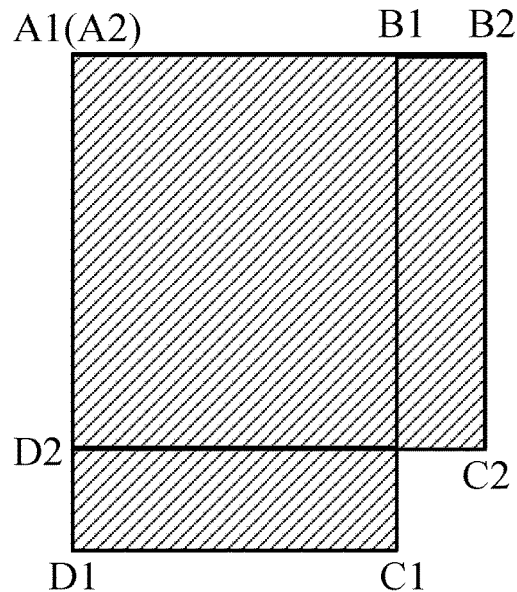
FIG. 3c is a schematic diagram of a union area in an overlap degree calculation of an object detection method according to another embodiment of the present application.

FIG. 3b is a schematic diagram of an intersection area in an overlap degree calculation of an object detection method according to another embodiment of the present application. FIG. 3c is a schematic diagram of a union area in an overlap degree calculation of an object detection method according to another embodiment of the present application. In FIGS. 3a-3b, a rectangle formed by four vertices A1, B1, C and D1 represents the enclosing frame, and a rectangle formed by four vertices A2, B2, C2 and D2 represents a candidate frame. As shown in FIGS. 3a and 3b, the vertices at the upper left corner of the enclosing frame and the candidate frame are aligned, that is, the vertex A1 and the vertex A2 are coincident. The shaded area shown in FIG. 3b represents the intersection area of the enclosing frame with the candidate frame, and the shaded area shown in FIG. 3c represents the union area of the enclosing frame with the candidate frame. The larger the ratio of the intersection area to the union area, the higher the overlap degree of the two rectangles and the closer in size.

In a possible implementation, selecting the reference frame from the candidate frames according to the overlap degrees includes: in a case that the overlap degree of the enclosing frame with a candidate frame is greater than an overlap threshold, determining the candidate frame as the reference frame.

In this implementation, the overlap threshold is predetermined. In a case that the calculated IOU value of the enclosing frame with a candidate frame is greater than the predetermined overlap threshold, the size of the candidate frame is considered to be closer to the size of the enclosing frame. As such, the Top N candidate frames (N candidate frames at the forefront) are selected, which are closer in size to the enclosing frame, and are determined as the reference frames. In the subsequent feature extracting, only the feature of the reference frames can be considered. For example, only the size-related data of the enclosing frame and the reference frames is extracted as a feature. In addition to the reference frames, the remaining candidate frames and the enclosing frame differ greatly in size, and data of related features corresponding to the remaining candidate frames can be determined to be zeros.

In a possible implementation, the generating a size-related feature according to a size of the reference frame and a size of the enclosing frame includes determining a width ratio and a height ratio of the enclosing frame with the reference frame as the size-related feature, or determining a natural logarithm of the width ratio and a natural logarithm of the height ratio as the size-related feature.

In this implementation, a features related to size, or aspect ratio is generated according to the size of the reference frame and the enclosing frame. For example, for each candidate frame, the width ratio of two rectangles (candidate frame and the enclosing frame), the height ratio of two rectangles, or the natural logarithm of the width ratio of the two rectangles and the natural logarithm of the height ratio of the two rectangles can be extracted as the size-related feature.

It is noted that, the shapes of the enclosing frame and the candidate frame are not limited to rectangles, and may be polygons.

The features of the above method are related to the object size, and prediction criterion related to the object size is added on the basis of an original feature, thereby further improving the accuracy of the object detection.

Figure 4:
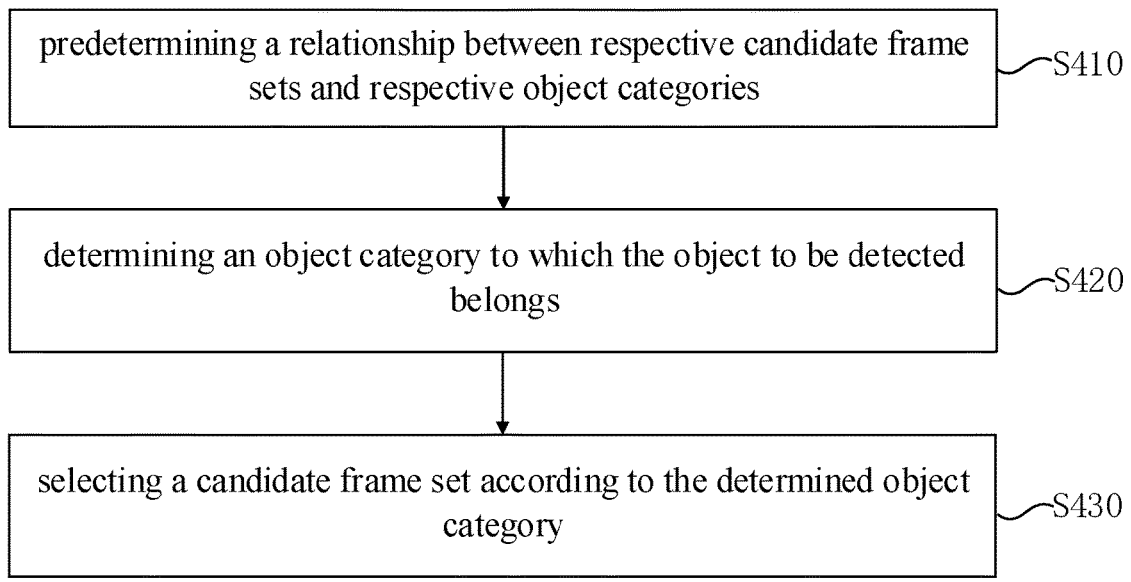
FIG. 4 is a step flowchart of selecting a candidate frame set of an object detection method according to another embodiment of the present application.

FIG. 4 is a flowchart of selecting a candidate frame set of an object detection method according to another embodiment of the present application. As shown in FIG. 4, in a possible implementation, the method includes Step S410, predetermining a relationship between respective candidate frame sets and respective object categories; Step S420, determining an object category to which the object to be detected belongs; and Step S430, selecting a candidate frame set according to the determined object category.

In this implementation, a size-related feature related to an object category is generated according to an object category, such as a vehicle category, a furniture category. By determining a category in advance, the accuracy of the object detection can be further improved.

Firstly, in Step S410, a relationship between respective candidate frame set and respective object category are predetermined. For example, in the vehicle category, the train may be of a long rectangular shape with a large aspect ratio; a small car may have a width of 3-4 meters, a height of 1.6-1.8 meters, and an aspect ratio of 1.5-2.5. Therefore, it can be understood that a range of the aspect ratio of the candidate frame in the vehicle category is relatively large. For example, in the furniture category, the range of the aspect ratio of the candidate frame is relatively moderate. Generally, the aspect ratio of the furniture is much smaller than that of the train.

Next, in Step S420, an object category can be determined. For example, the determined category may be a vehicle, furniture and the like. The object category can be determined by using regional features, boundary features, or deep learning network features.

Then, in S430, the candidate frame set is selected according to the determined object category to generate the size-related features related to the object category, thereby further improving the accuracy of object detection.

The above technical solution has the following advantages or beneficial effects: the object detection is performed by using a feature related to an object size, that is, the prediction criterion related to the object size is added to an original feature in a machine learning model, thereby further improving the accuracy of the object detection.

Figure 5:
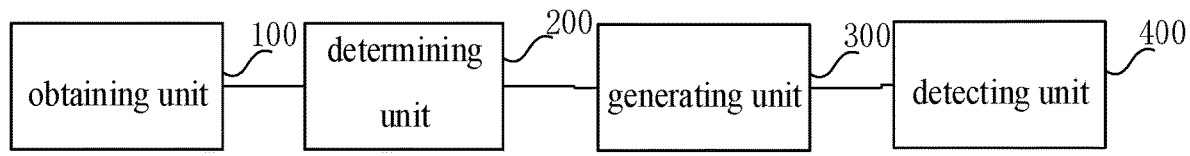
FIG. 5 is a structural block diagram of an object detection device according to an embodiment of the present application.

FIG. 5 is a structural block diagram of an object detection device according to an embodiment of the present application. As shown in FIG. 5, the object detection device includes an obtaining unit 100 configured to obtain an enclosing frame of a target object in an input image; a determining unit 200 configured to, according to the enclosing frame, determine a reference frame from a predetermined candidate frame set comprising a plurality of candidate frames; a generating unit 300 configured to generate a size-related feature according to a size of the reference frame and a size of the enclosing frame; and a detecting unit 400 configured to detect an object in the input image by applying the size-related feature in a machine learning model.

Figure 6:
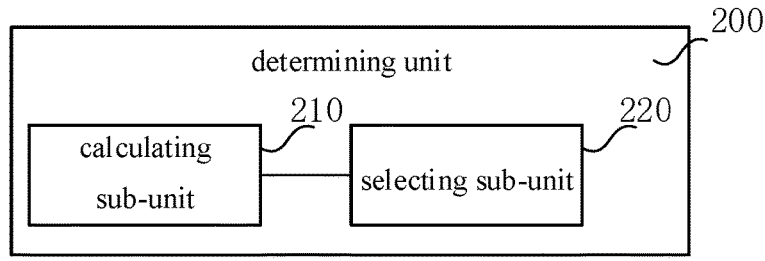
FIG. 6 is a structural block diagram of a determining unit of an object detection device according to an embodiment of the present application.

FIG. 6 is a structural block diagram of a determining unit of an object detection device according to an embodiment of the present application. As shown in FIG. 6, in one possible implementation, the determining unit 200 includes a calculating sub-unit 210 configured to calculate respective overlap degrees of the enclosing frame of the target object with respective candidate frames in the candidate frame set; and a selecting sub-unit 220 configured to select the reference frame from the candidate frames according to the respective overlap degrees.

In one possible implementation, the calculating sub-unit 210 is further configured to for each candidate frame, align the enclosing frame with the candidate frame at one vertex; calculate an intersection-over-union of the enclosing frame with the candidate frame; and determine the calculated intersection-over-union as the overlap degree of the enclosing frame with the candidate frame.

In one possible implementation, the selecting sub-unit 220 is further configured to, in a case that the overlap degree of the enclosing frame with a candidate frame is greater than an overlap threshold, determine the candidate frame as the reference frame.

In one possible implementation, the generating unit 300 is further configured to determine a width ratio and a height ratio of the enclosing frame with the reference frame as the size-related feature, or determine a natural logarithm of the width ratio and a natural logarithm of the height ratio as the size-related feature.

Figure 7:
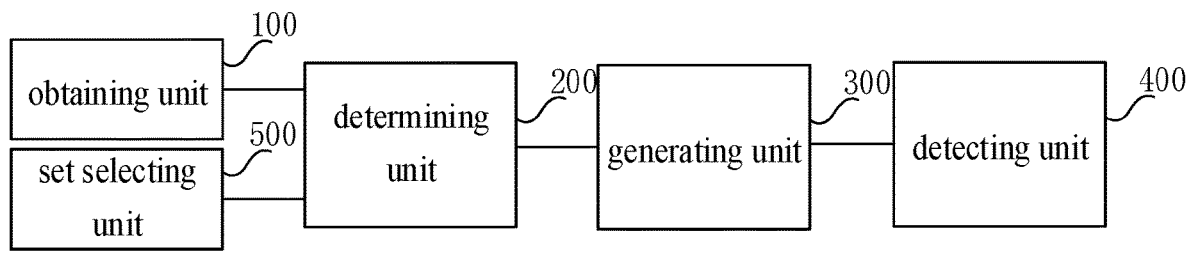
FIG. 7 is a structural block diagram of an object detection device according to another embodiment of the present application.

FIG. 7 is a structural block diagram of an object detection device according to another embodiment of the present application. As shown in FIG. 7, in one possible implementation, the device includes further a set selecting unit 500 configured to predetermine a relationship between respective candidate frame sets and respective object categories; determine an object category to which the object to be detected belongs; and select a candidate frame set according to the determined object category.

In this embodiment, functions of units in the objection detection device refer to the corresponding description of the above mentioned method and thus the description thereof is omitted herein.

In a possible design, the objection detection apparatus includes a processor and a storage, the storage is configured to store a program for supporting the above objection detection method executed by the objection detection apparatus, the processor is configured to execute the program stored in the storage. The objection detection apparatus further includes a communication interface configured for communication between the objection detection apparatus and another apparatus or communication network.

Figure 8:
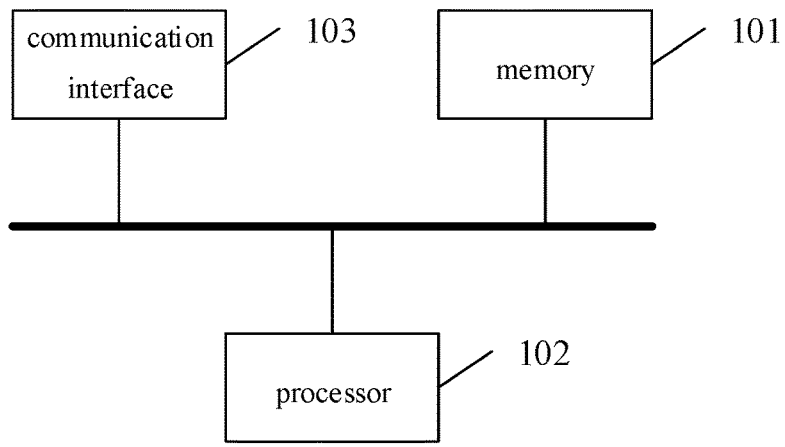
FIG. 8 is a structural block diagram of an object detection apparatus according to another embodiment of the present application.

FIG. 8 is a structural block diagram of an object detection device according to another embodiment of the present application. As shown in FIG. 8, the apparatus includes a memory 101 and a processor 102. The memory 101 stores a computer program executable on the processor 102. When the processor 102 executes the computer program, the service data promotion method in the foregoing embodiment is implemented. The number of the memory 101 and the processor 102 may be one or more.

The apparatus further includes:

a communication interface 103 configured to communicate with an external device and exchange data.

The memory 101 may include a high-speed RAM memory and may also include a non-volatile memory, such as at least one magnetic disk memory.

If the memory 101, the processor 102, and the communication interface 103 are implemented independently, the memory 101, the processor 102, and the communication interface 103 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 8, but it does not mean that there is only one bus or one type of bus.

Optionally, in a specific implementation, if the memory 101, the processor 102, and the communication interface 103 are integrated on one chip, the memory 101, the processor 102, and the communication interface 103 may implement mutual communication through an internal interface.

According to an embodiment of the present application, a computer-readable storage medium is provided for storing computer software instructions, which include programs involved in execution of the above method for object detection.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. An object detection method, comprising:
   obtaining an enclosing frame of a target object in an input image;
   according to the enclosing frame, calculating respective overlap degrees of the enclosing frame of the target object with respective candidate frames in a candidate frame set, the candidate frame set is a predetermined frame set associated with the category of the target object in the input image and each target object in the input image has one corresponding candidate frame set;
   determining a predetermined number of candidate frames with overlap degrees thereof ranked in the top as reference frames;
   generating a size-related feature according to respective sizes of the reference frames and a size of the enclosing frame; and
   detecting an object in the input image by applying the size-related feature in a machine learning model.

2. The object detection method according to claim 1, wherein each of the enclosing frame and the candidate frames is of a polygon shape, and the calculating respective overlap degrees of the enclosing frame of the target object with respective candidate frames in the candidate frame set comprises:
   for each candidate frame,
   aligning the enclosing frame with the candidate frame at one vertex;
   calculating an intersection-over-union of the enclosing frame with the candidate frame; and
   determining the calculated intersection-over-union as the overlap degree of the enclosing frame with the candidate frame.

3. The object detection method according to claim 1, wherein the determining a predetermined number of candidate frames with overlap degrees thereof ranked in the top as reference frames comprises:
   in a case that the overlap degree of the enclosing frame with the candidate frame is greater than an overlap threshold, determining the candidate frame as the reference frame.

4. The object detection method according to claim 1, wherein the generating a size-related feature according to respective sizes of the reference frames and a size of the enclosing frame comprises:
   determining a width ratio and a height ratio of the enclosing frame with the reference frame as the size-related feature, or determining a natural logarithm of the width ratio and a natural logarithm of the height ratio as the size-related feature.

5. The object detection method according to claim 1, wherein the method further comprises:
   predetermining a relationship between respective candidate frame sets and respective object categories;
   determining an object category to which the object to be detected belongs; and
   selecting a candidate frame set according to the determined object category.

6. An object detection device, comprising:
   one or more processors; and
   a storage device configured for storing one or more programs, wherein the one or more programs, when executed by the one or more processors, cause the one or more processors to:
   obtain an enclosing frame of a target object in an input image;
   according to the enclosing frame, calculate respective overlap degrees of the enclosing frame of the target object with respective candidate frames in a candidate frame set, the candidate frame set is a predetermined frame set associated with the category of the target object in the input image and each target object in the input image has one corresponding candidate frame set;
   determine a predetermined number of candidate frames with overlap degrees thereof ranked in the top as reference frames;
   generating a size-related feature according to respective sizes of the reference frames and a size of the enclosing frame; and
   detect an object in the input image by applying the size-related feature in a machine learning model.

7. The object detection device according to claim 6, wherein the one or more programs are executed by the one or more processors to enable the one or more processors to:
   for each candidate frame,
   align the enclosing frame with the candidate frame at one vertex;
   calculate an intersection-over-union of the enclosing frame with the candidate frame; and
   determine the calculated intersection-over-union as the overlap degree of the enclosing frame with the candidate frame.

8. The object detection device according to claim 6, wherein the one or more programs are executed by the one or more processors to enable the one or more processors to:
   in a case that the overlap degree of the enclosing frame with the candidate frame is greater than an overlap threshold, determine the candidate frame as the reference frame.

9. The object detection device according to claim 6, wherein the one or more programs are executed by the one or more processors to enable the one or more processors to:
   determine a width ratio and a height ratio of the enclosing frame with the reference frame as the size-related feature, or determine a natural logarithm of the width ratio and a natural logarithm of the height ratio as the size-related feature.

10. The object detection device according to claim 6, wherein the one or more programs are executed by the one or more processors to enable the one or more processors to:

predetermine a relationship between respective candidate frame sets and respective object categories;

determine an object category to which the object to be detected belongs; and select a candidate frame set according to the determined object category.

11. A non-transitory computer-readable storage medium, in which a computer program is stored, wherein the computer program, when executed by a processor, causes the processor to implement the method of claim 1.

* * * * *